United States Patent [19]
Brumfield

[11] Patent Number: 5,784,830
[45] Date of Patent: *Jul. 28, 1998

[54] FISH HOOK REMOVING DEVICES

[76] Inventor: John H. Brumfield, 4610 Emerald Dr., Colorado Springs, Colo. 80918

[*] Notice: The term of this patent shall not extend beyond the expiration date of Pat. No. 5,421,120.

[21] Appl. No.: 582,115

[22] Filed: Jan. 2, 1996

[51] Int. Cl.⁶ ................................................ A01K 97/18
[52] U.S. Cl. ................................................ 43/53.5
[58] Field of Search .................... 43/53.5; 294/93, 294/97; 606/205, 208, 207, 210, 107, 209, 211

[56] References Cited

U.S. PATENT DOCUMENTS

| D. 192,737 | 5/1962 | Pyland | 43/53.5 |
|---|---|---|---|
| 1,777,695 | 10/1930 | Jeffrey | 43/53.5 |
| 2,493,142 | 1/1950 | Hutton | 43/53.5 |
| 2,695,471 | 11/1954 | Imberti | 43/53.5 |
| 2,797,523 | 7/1957 | Dillard | 43/53.5 |
| 2,861,384 | 11/1958 | Kubin | 43/53.5 |
| 2,862,327 | 12/1958 | Steinhauser | 43/53.5 |
| 2,947,106 | 8/1960 | Lewan | 43/53.5 |
| 3,132,438 | 5/1964 | Ward et al. | 43/53.5 |
| 4,014,131 | 3/1977 | Bendik | 43/53.5 |
| 4,631,855 | 12/1986 | Ader | 43/53.5 |
| 4,947,576 | 8/1990 | Hull et al. | 43/53.5 |
| 5,421,120 | 6/1995 | Brumfield | 43/53.5 |
| 5,475,941 | 12/1995 | Moore | 43/53.5 |

FOREIGN PATENT DOCUMENTS

| 1141765 | 3/1957 | France | 43/53.5 |
|---|---|---|---|

*Primary Examiner*—Michael J. Carone
*Assistant Examiner*—Darren Ark
*Attorney, Agent, or Firm*—Ancel W. Lewis, Jr.

[57] ABSTRACT

Hand-held devices for removing fish hooks disclosed have top and bottom members connected at an intermediate pivot to move in a rocker-type action between two positions. A first embodiment has U-shaped top and bottom front portions that nest together in one position with slots arranged to engage a hook and remove different types of hooks and different sizes of hooks. A second embodiment has flat inclined sections with slots arranged with one movable relative to the other to form a pocket to enclose a hook for removal. A third embodiment combines the features of the first two at opposite ends of a common intermediate pivot.

Fish hook removing devices disclosed have a high degree of versatility for a wide range of hook sizes, hook types, for a wide range of fish sizes, may be used with a minimum of effort, and a minimum damage to the fish.

12 Claims, 4 Drawing Sheets

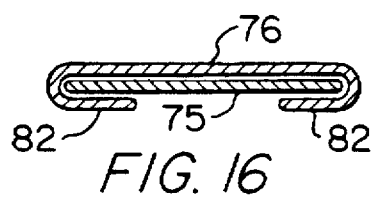
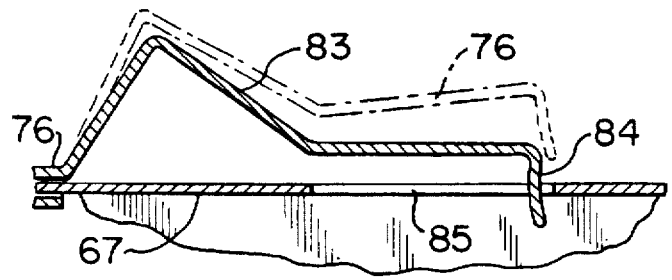
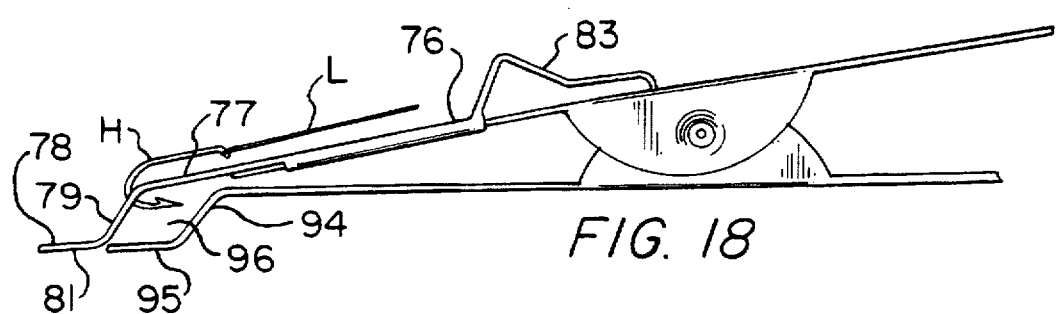
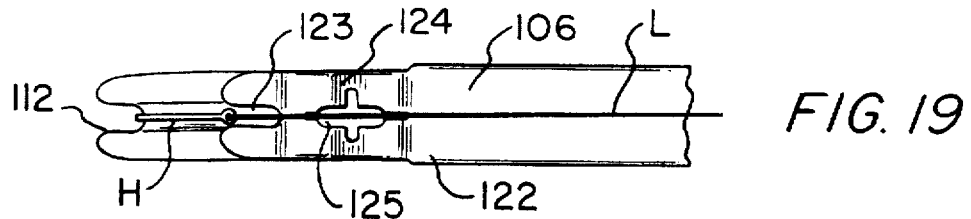
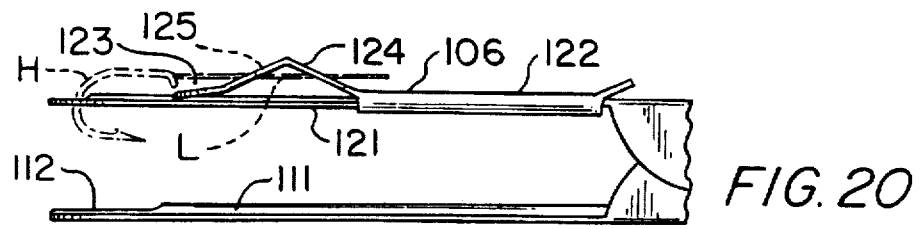
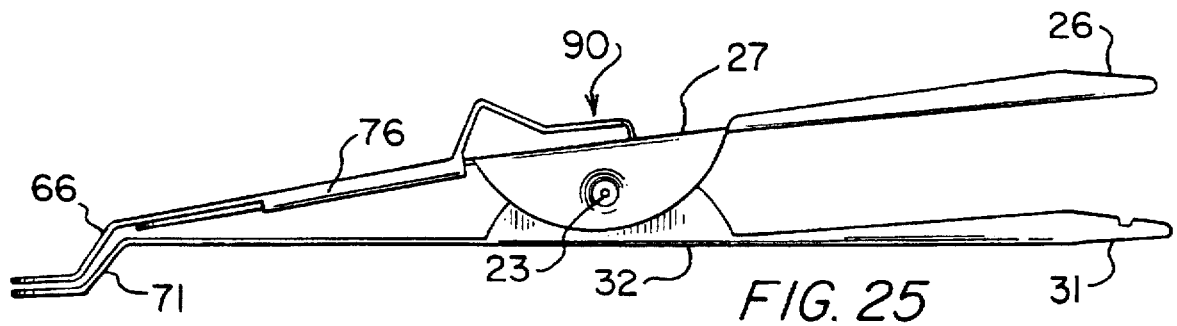

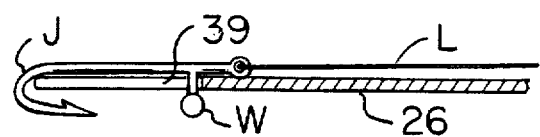
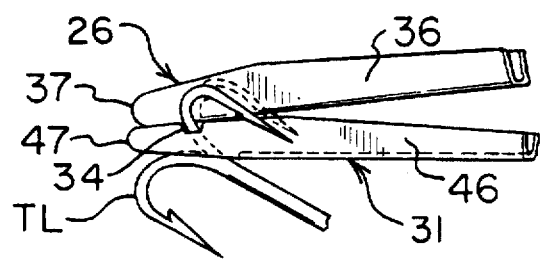
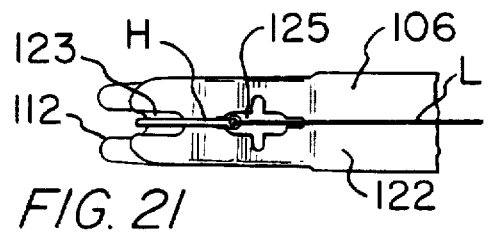
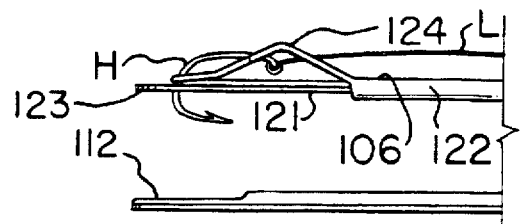
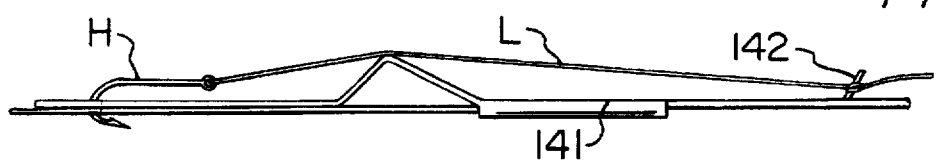
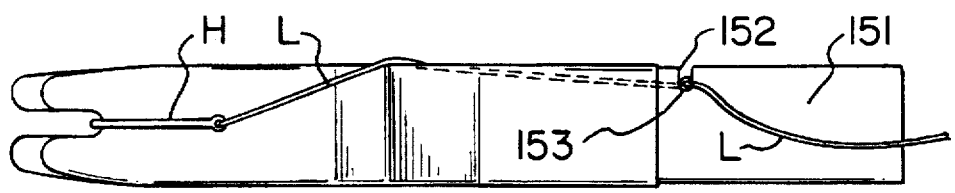

5,784,830

FISH HOOK REMOVING DEVICES

TECHNICAL FIELD

This invention generally relates to fishing aid tools and more particularly to devices for removing fish hooks from a fish.

BACKGROUND ART

In the past a number of attempts have been made to provide devices to aid the fisherman in removing a hook from a fish.

In U.S. Pat. No. 5,421,120 there are disclosed devices for removing fish hooks having two top and bottom members arranged so that insertion of the front end portions of the device into the inside of the fish through the mouth aids in removing a fish hook.

DISCLOSURE OF THE INVENTION

The fish hook removing devices disclosed have a top member and a bottom member, preferably made of stamped sheet metal that pivotally connects at a pivot preferably midway between the opposite ends of the members. The pivot is preferably formed by nesting an inverted U-shaped top intermediate portion in a U-shaped bottom intermediate portion with a pair of opposed, spaced indentations in a pair of spaced top side wall portions releasably fitting in a pair of opposed, spaced indentations in the bottom side wall portions and inward flexure of the side wall portions of one portion allows the two members to be readily assembled and disassembled.

In a first embodiment the top member has a top front portion with a longitudinal front slot opening in the front end. The bottom member has a bottom front portion with a longer longitudinal front slot opening in the front end. The top front portion nests in the bottom front portion when the members are in one position. The bottom front portion serves as a cover for the barb of a hook in the top front portion during withdrawal of the hook and for larger sized hooks the top and bottom front portions are readily pivoted apart to cover the barb.

In a second embodiment the top and bottom members are generally flat with the top member having one section slidable relative to another section and to the bottom member and each is provided with an inclined extension beyond the slot to form a pocket for enclosing the hook during removal. A modification has a slot in the movable member to lock the hook during removal.

In a third embodiment the two front end portions of the two earlier described embodiments are combined at opposite ends of the same intermediate portions to provide greater versatility for different hooks, different hook sizes and different fish.

BRIEF DESCRIPTION OF THE DRAWINGS

Details of this invention are described in connection with the accompanying drawings which like parts bear similar reference numerals in which:

FIG. 4 is a fragmentary view showing a jig in the inside slot of the top member of FIG. 1.

FIG. 12 is a fragmentary side elevation view of FIG. 11.

FIG. 16 is a sectional view taken along line 16—16 of FIG. 14 showing how the upper movable portion fastens to the lower stationary portion.

FIG. 17 is a sectional view along line 17—17 of FIG. 14 showing the slot and retainer for the top movable section.

FIG. 18 is a side elevation view of the device of FIGS. 13–17 with a hook in place showing the top movable section slid forward to form a pocket.

FIG. 19 is a fragmentary top plan view of a modified form of the second embodiment of the device.

FIG. 20 is a side elevational view of the device of FIG. 19.

FIG. 21 is the top plan view of the device of FIG. 19 with the top movable section moved forwardly to engage the hook in the inside slot.

FIG. 22 is a side elevation view of the device of FIG. 21.

FIG. 23 is a side elevation view of a modified form of top movable section.

FIG. 24 is a top plan view of another modified form of top movable section.

FIG. 25 is a side elevation view of a third embodiment of a fish hook removing device embodying features of the present invention.

DETAILED DESCRIPTION

Figure 1:
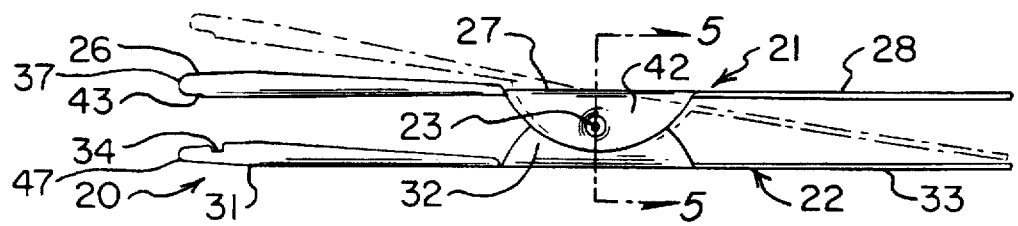
FIG. 1 is a side elevation view of a first embodiment of a fish hook removing device embodying features of the present invention with a spread position shown in dashed lines.
Figure 2:
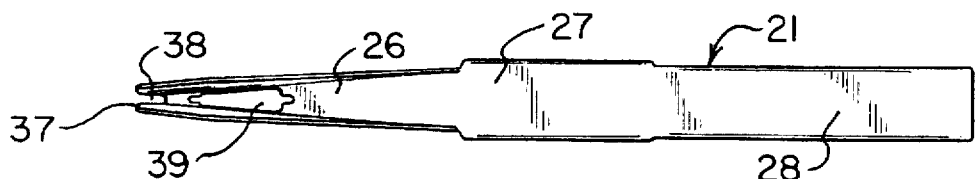
FIG. 2 is a top elevation view of the device of FIG. 1.
Figure 3:
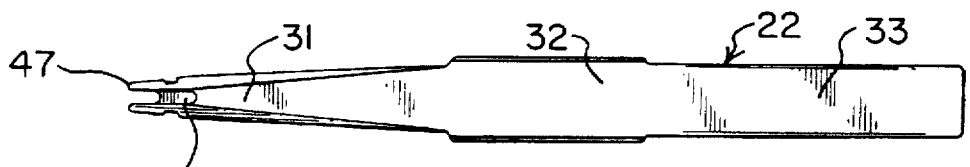
FIG. 3 is a bottom elevation view of the device of FIG. 1.

Referring now to FIGS. 1–10 there is shown a first embodiment of a fish hook removing device 20 which includes a top member 21 and a bottom member 22 pivotally connected to one another midway between opposite ends to rotate about a pivot axis 23 between a first position in which the front portions nest together and a second position in which the front portions are spread apart a maximum distance as shown in dashed lines in FIG. 1. The members 21 and 22 are shown in an intermediate position in which they are parallel to one another. The top member 21 has a top front portion 26, a top intermediate portion 27 and a flat top handle portion 28. The bottom member 22 has a bottom front portion 31, a bottom intermediate portion 32 and a flat bottom handle portion 33.

The top and bottom members 21 and 22 preferably are made from a flat strip of sheet metal that is punched or stamped by a pair of dies into the particular shape shown so as to be readily assembled and disassembled as described hereinafter. The sheet metal is flexible, pliable and resilient.

Figure 8:
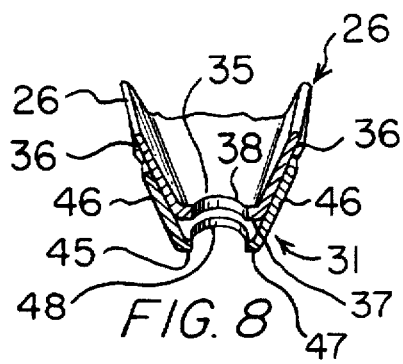
FIG. 8 is a sectional view taken along line 8—8 of FIG. 7 with the hook removed.

As seen in FIG. 8, the top front portion 26 is generally U-shaped having a base wall portion 35 and a pair of spaced, upwardly diverging side wall portions 36. The top front portion 26 also tapers inwardly toward the front end 37 as viewed from the top and also as viewed from the side. The side wall portions 36 are the maximum height a selected distance rearwardly from the front end and taper or decrease in width toward the front end and also toward the top intermediate portion 27. The front end 57 is rounded or radiused. A longitudinal front slot 38 in the base wall portion 35 opens into the front end 37.

Another longitudinal inside slot 39 is provided in the base wall portion 35 rearwardly from the front slot 38. This slot 39 is particularly suitable for enabling the weight W of a jig-type hook J that extends at right angles to the end of the shank to b)e passed through inside slot 39 and the line L to be drawn with the shank along a straight line as shown in FIG. 4.

Figure 5:
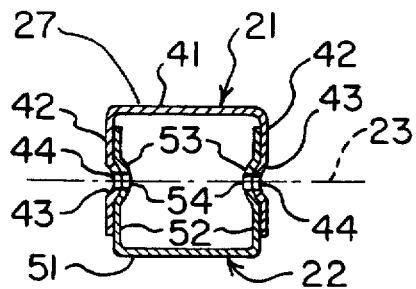
FIG. 5 is a sectional view taken along line 5—5 of FIG. 1 through the pivot for the device.
Figure 6:
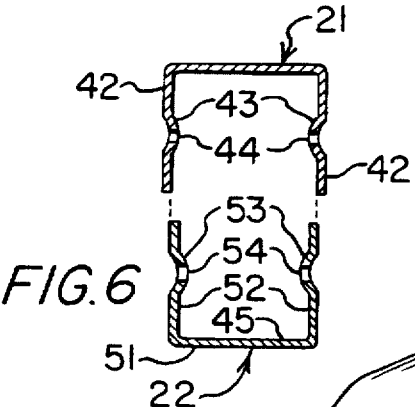
FIG. 6 is a sectional view like FIG. 4 showing the top and bottom members separated.

The top intermediate portion 27 has an inverted U-shape having a base wall portion 41 and a pair of downturned spaced side wall portions 42. The side wall portions 42 shown as viewed from the side have a curved or arcuate profile being wider at the middle and diminishing toward the ends. Referring now to FIGS. 5 and 6 the side wall portions 42 have a pair of inwardly spaced indentations 43 between the upper and lower extremities thereof and a hole 44 is formed in each indentation 43. The top handle portion 28 is flat and a rearward extension of base wall portion 41.

The bottom front portion 31 is also U-shaped and tapered toward the front end, has a base wall portion 45 and a pair of spaced upwardly diverging upright side wall portions 46. A pair of aligned recesses 34 are provided in the top edge of side wall portions 46 rearwardly of front end 47. The base wall portion 45 has a curved or radiused front end 47 with a longitudinal bottom front slot 48 longer than slot 38 opening to the front end 47. The bottom front portion 31 also tapers inwardly toward the front end 47 as viewed from the top and also as viewed from the side. The side wall portions 46 are at a maximum height a selected distance rearwardly from the front end and taper or decrease in width toward the front end and also toward the bottom intermediate portion 32.

Referring now to FIGS. 5 and 6 the bottom intermediate portion 32 is generally U-shaped having a base wall portion 51 and a pair of upturned spaced side wall portions 52 with an inturned indentation 53 each having a hole 54.

The top and bottom intermediate portions 27 and 32 snap fit together by applying pressure to the flexible or pliable side walls to deform them so the device will fit together and then spring back in place after deformation and then form a rocker type hinge to be able to pivot about pivot axis 23. The motion of the top and bottom members when cradled in one hand of a user is a rocker action with a range of movement about pivot axis 23 being limited and about ten (10) degrees each direction from the neutral position shown or a total range of about twenty (20) degrees. By way of example and not a limitation, the device has a total length of about 9 inches with the axis 23 at about 4.5 inches from the ends. The maximum width is slightly less than one inch.

Figure 7:
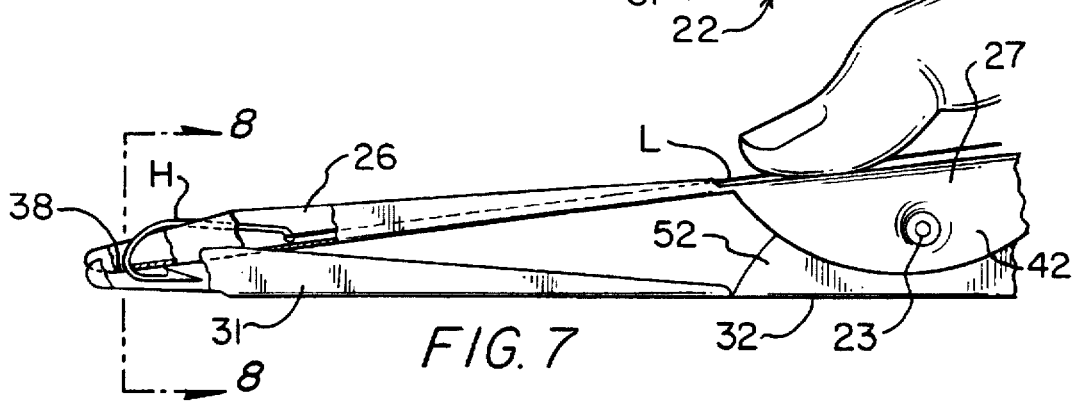
FIG. 7 is an enlarged side elevation view of the top and bottom front portions of the device of FIG. 1 with a fish hook in place and portions broken away to show interior parts and showing a thumb holding the line taut.

In operation, the user would place a thumb on the lead line L to hold the hook H against the front slot 38 as seen in FIG. 7. In one position, the top front portion 26 nests in the bottom front portion 31 as shown in FIG. 8. This nesting of the top front portion 26 in the bottom front portion 31 serves as an alignment of the top and bottom members as well as reinforce the rocker type hinge at pivot 23.

Figure 9:
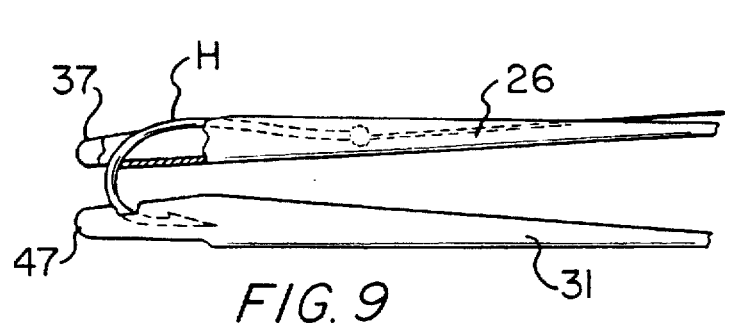
FIG. 9 is an enlarged side elevation view of top and bottom front portions of the device shown in FIG. 1 with the top and bottom jaws apart and shown holding a larger hook.
Figure 10:
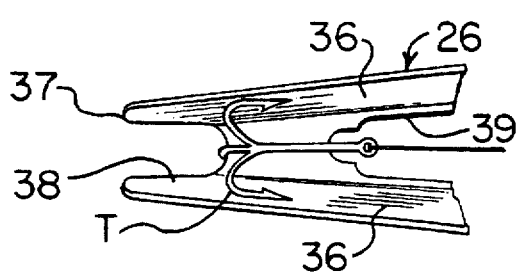
FIG. 10 is a top plan view of a fragment of the top jaw showing a small treble hook being removed.

The top front portion 26 will hold a single hook H and will also hold a treble hook T and enclose a smaller sized treble hook entirely as shown in FIG. 10. When the top front portion 26 and bottom front portion 31 are spread apart by pivoting about pivot 23, they will contain and cover the barb of a larger hook H as shown in FIG. 9 so the hook will not catch during removal.

Figure 11:
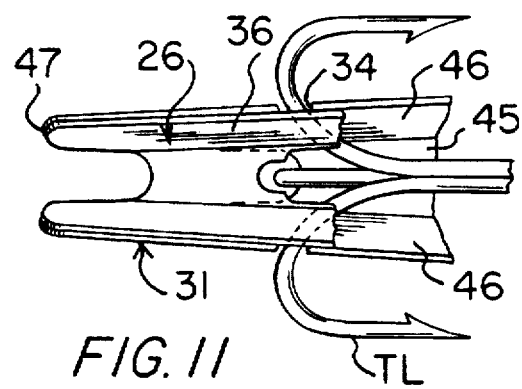
FIG. 11 is a top plan view of a fragment of the top front portions of the bottom members of the device of FIG. 1 showing a large treble hook being removed.

Referring now to FIG. 11 the bottom front portion 31 may be used to engage much larger treble hooks TL as shown in FIG. 11. In this case, the top front portion 26 is pressed down against the hook TL and the bottom front portion 31 and the two top barbs are held in the opposed pair of recesses 34 which keeps the hook from moving relative to the device when the hook is removed. Larger treble hooks TL usually are not down in the inside of the fish but are on the lip or other easily accessed part of the fish.

Figure 13:
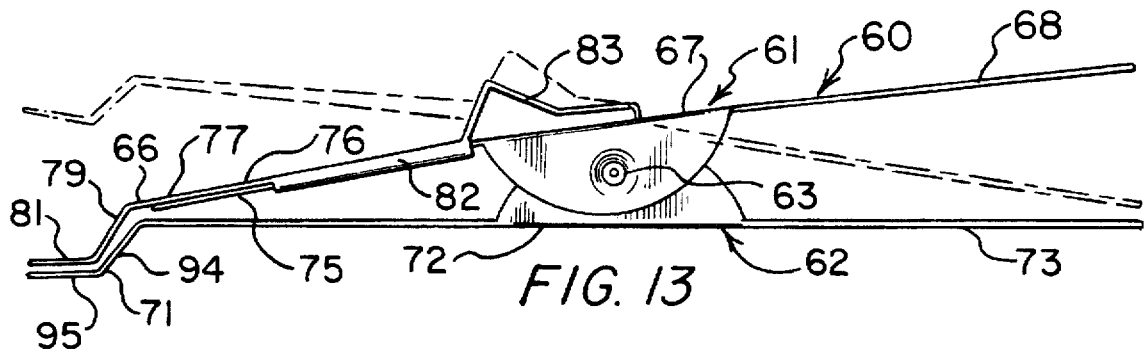
FIG. 13 is a side elevation view of a second embodiment of a fish hook removing device embodying features of the present invention.
Figure 14:
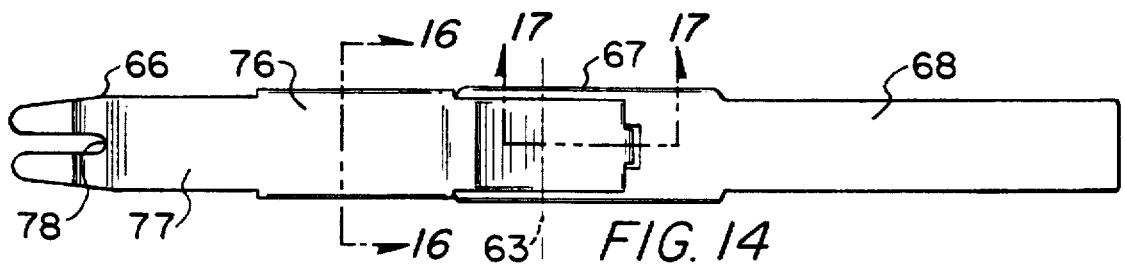
FIG. 14 is a top plan view of the device of FIG. 13.
Figure 15:
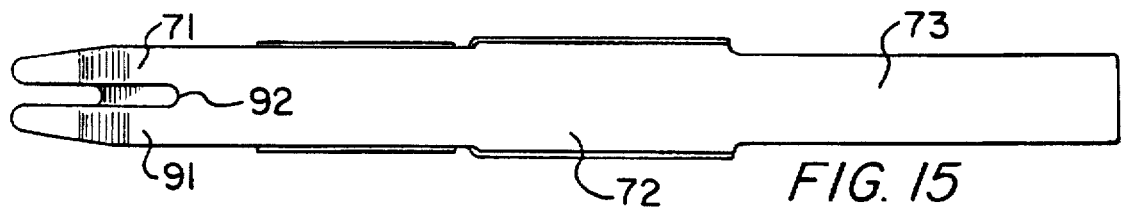
FIG. 15 is a bottom plan view of the device of FIG. 13.

Referring now to FIGS. 13-18 there is shown a second embodiment of a fish hook removing device 60 having a top member 61 and a bottom member 62 pivotally connected to one another between opposite ends to rotate about a pivot axis 63 between a first position as shown in FIG. 13 and a second position as shown in dashed lines. The top member 61 includes a top front portion 66, a top intermediate portion 67 and a rear handle portion 68. The bottom member 62 has a bottom front portion 71, a bottom intermediate portion 72 and a bottom handle portion 73.

The top front portion 66 has a top base section 75 that forms a forward extension of the top intermediate portion 67 and a top movable section 76 that mounts on and is slidably movable on the top base section 75. The top movable section 76 includes a front top base wall portion 77 with a front slot 78 opening at the front end which will receive the fish hook H. The top movable section 76 has a forked front end extension including an inclined section 79 extending forwardly and downwardly at an angle from the front top base wall 77 and a forward front end section 81 extending forwardly of the inclined section 79. The inclined section 79 is at an angle of 45 degrees to the horizontal. The top movable section 76 further has a pair of bent under guide arms 82 which extend around the stationary top base section 75 so the top movable section 76 is formed with an upstanding angled section 83 engaged by the users thereof. A downturned tab 84 is provided at the rear end of top movable section 76. A slot 85 in the base wall portion of the top intermediate portion 67 receives the tab 84 and the tab is provided to keep the top movable section 76 from sliding off the stationary top base section 75 and the forward edge of the slot limits the forward movement. The top movable section 76 will slide forwardly and rearwardly on the stationary section and be retained by guide arms 82, slot 85 and tab 84. The top movable section 76 is readily assembled and disassembled from the top base section 75 by raising the tab to clear the slot as shown in FIG. 17 and sliding the movable section relative to the base section.

The bottom front portion 71 has a base wall 91 with a bottom front slot 92 opening in the front end, a forked front end extension including a bottom inclined section 94 extending forwardly and downwardly at an angle and a bottom front end section 95 extending forwardly of the inclined section. In use, the hook 1H is placed in the front slot 78 by insertion of the device into the mouth of the fish along the line and hook, the top movable section 76 is slid forwardly to form the pocket 96 as shown in FIG. 18 and then the hook is withdrawn from the inside of the fish with the barb fully covered by the bottom inclined section 94 during withdrawal.

Referring now to FIGS. 19–22 there is shown a modified form of the second embodiment wherein there is provided a top front portion 106 and a bottom front portion 111. The top front portion 106 has a top base section 121 and a top movable section 122. The bottom front portion 111 is straight and has a bottom front slot 112. The top movable section 122 has a top front slot 123 and a raised inclined section 124 with an inside slot 125 rearwardly of the top front slot 123.

In use, the top movable section.122 is retracted as shown in FIGS. 19 and 20 and the bottom front portion 111 is inserted into the mouth of the fish and the hook H fits into bottom front slot 112. The top movable section 122 is moved rearwardly and the shank of the hook rides up the raised inclined section 124 and snaps into the inside slot 125 as seen in FIGS. 21 and 22. This locks the hook tightly and it can then be retracted from the mouth of the fish.

Referring now to FIG. 23 a modified top movable section 141 is shown as provided with a raised tab 142 at the rear end around which the line of the hook is wrapped to hold the line taut and the hook against movement during removal.

FIG. 24 shows a modified top movable section 151 with a side slot 152 where a knot 153 in the line can be used to hold the line taut.

Referring now to FIG. 25 there is shown a device 90 which combines the hook removing parts of the embodiments of FIGS. 1–12 and the embodiment of FIGS. 13–18 so as to provide greater versatility depending on the size of the hook and the size of the fish. This combination device has a top front portion 26 and bottom front portion 31 as above described at one end and a top front portion 66 and bottom front portion 71 with a top movable section 76 as above described at the other end. The top and bottom intermediate portions 27 and 32 as above described are the same with the snap fit to form the pivot at pivot axis 23. When one end portion is used as a hook remover the other end portion serves as handles.

Although the present invention has been described with a certain degree of particularity, it is understood that the present disclosure has been made by way of example and that changes in details of structure may be made without departing from the spirit thereof.

What is claimed is:

1. A hand-held fish hook removing device comprising:

a top member and a bottom member pivotally connected to one another between opposite front and rear ends to rotate about a pivot axis between a first position and a second position in a rocker motion, said top member having a top front portion having a top base wall portion with a longitudinally extending open top slot opening in the front end for receiving a fish hook, a top intermediate portion and a top handle portion, said top intermediate portion being generally an inverted U shape having a top base wall portion and a pair of spaced downwardly extending top side wall portions, said bottom member having a bottom front portion arranged to cover a hook barb of said fish hook when said fish hook is in said top member, a bottom intermediate portion and a bottom handle portion, whereby when said fish hook is embedded inside a fish said fish hook is received in said top slot by a movement of said top front portion and bottom front portion into the inside of a fish, said fish hook is released for the removing of said fish hook from the mouth of said fish, said bottom intermediate portion being generally U-shaped having a bottom base wall portion and a pair of spaced upwardly extending bottom side wall portions, said pair of top side wall portions overlapping said pair of bottom side wall portions and releasably fastened in a rocker hinge at said pivot axis about which said top member and bottom member rock back and forth between said positions, said pair of top side wall portions having a pair of aligned first indentations and said bottom pair of wall side portions having a pair of aligned second indentations that receive and slidably interfit with said aligned first pair of indentations, said pairs of first and second indentations being slidably engaged and caused to flex for releasably holding said top and bottom members at said pivot axis for pivotal movement and enabling ready assembly and disassembly of the top and bottom members, an elongated horizontally extending inside slot in said top base wall portion rearwardly of said open top slot for passing a weight on a hook having a shank and barb end and supporting said shank along said top base wall portion, said bottom front portion having a longitudinally extending open bottom slot opening at the front end for receiving said barb end, each of said top and bottom front portions being generally U-shaped in cross section and upright to open at the top, each of said top and bottom front portions having a straight base section and spaced, straight side sections, and tapered toward the front end, said side sections being concavely rounded at a front end, said top front portion nesting in said bottom front portion in said first position to maintain alignment of and reinforce said pivotal connection between said first and second pairs of indentations, said bottom front portion having a pair of opposed recesses opening in the top of said side sections of said bottom front portion to hold a first hook and a second hook of a treble hook gripped between said top and bottom front portions against movement with a third hook of said treble hook extending through said open bottom slot for the removal of said treble hook from the mouth of a fish.

2. A device as set forth in claim 1 wherein each of said first and second pairs of indentations have an aperture.

3. A device as set forth in claim 1 wherein said top and bottom members are each made of a flat strip of pliable sheet metal that is formed into a final shape.

4. A device as set forth in claim 1 wherein said pivot axis is centered midway between the ends of said top and bottom members.

5. A device as set forth in claim 1 wherein said top and bottom members move about said pivot axis through a limited angle relative to one another through no more than about twenty degrees.

6. A device as set forth in claim 1 wherein said top and bottom handle portions are generally flat strip.

7. A device as set forth in claim 1 wherein each of said top and bottom front portions have a base wall portion and upwardly diverging side wall portions, said top and bottom front portions tapering inwardly toward a front end as viewed from a top direction.

8. A hand-held device for removing a fish hook having at least one shank and a barb imbedded inside a fish and through a mouth of the fish comprising:

a top member and a bottom member pivotally connected to one another between opposite ends to rotate about a pivot axis between a first position and a second position in a rocker motion, said top member having a first top front portion having a first top base wall portion with a longitudinally extending first open top slot opening in a first front end for receiving the fish hook and a top intermediate portion, said bottom member having a first bottom front portion arranged to cover the hook barb when the fish hook in the top member is withdrawn and a bottom intermediate portion, whereby a hook embedded inside the fish is received in said first top slot by a movement of said first top front portion and first bottom front portion in said first position into the inside of the fish to release the fish hook and the fish hook and said top and bottom front portions are withdrawn from the mouth of the fish, said top member having a second top front portion having a top base section and a top movable section slidable relative to said top base section, said top movable section having a second top base wall portion with a longitudinally extending second open top slot opening in a second front end, a forked front end top extension extending forwardly of said second top base wall portion including a top inclined section extending forwardly and downwardly at an angle and a front end section extending forwardly of said inclined section and a top intermediate portion, said bottom member having a second bottom front portion including a second base wall portion having a longitudinally extending second open bottom slot opening in the second front end of said second base wall portion, a forked front end bottom extension extending forwardly of said second base wall portion including a bottom inclined section extending forwardly and downwardly at an angle and a bottom front end section extending forwardly of said bottom inclined section, whereby a hook embedded inside the fish is recessed in said second open top slot by a movement of said second top front portion and second bottom front portion in said first position into the inside of said fish and a movement of said top member relative to said bottom member to form a pocket between said top and bottom inclined sections that enclose a hook shank and barb for a movement of said top and bottom portions out of the mouth of the fish in a rearward motion as the fish hook is drawn through the mouth of the fish.

9. A device as set forth in claim 8 wherein said top movable section has a pair of side tabs extending around said top base section, said top movable section having a tab that extends into a slot in said top intermediate portion to guide and retain said top movable section on said top intermediate portion.

10. A device as set forth in claim 8 wherein said top movable section has a raised slot to engage the end of the fish hook to lock the fish hook against movement.

11. A device as set forth in claim 8 wherein said top movable section has a raised tab at the rear end around which a line attached to the fish hook is wrapped to secure the fish hook.

12. A device as set forth in claim 8 wherein said top movable section has a side slot through which a line with a knot attached to a fish hook is attached to hold the line taut.

* * * * *